(No Model.)
N. R. BAAR.
SELF BASTING ROASTER.
No. 323,622. Patented Aug. 4, 1885.
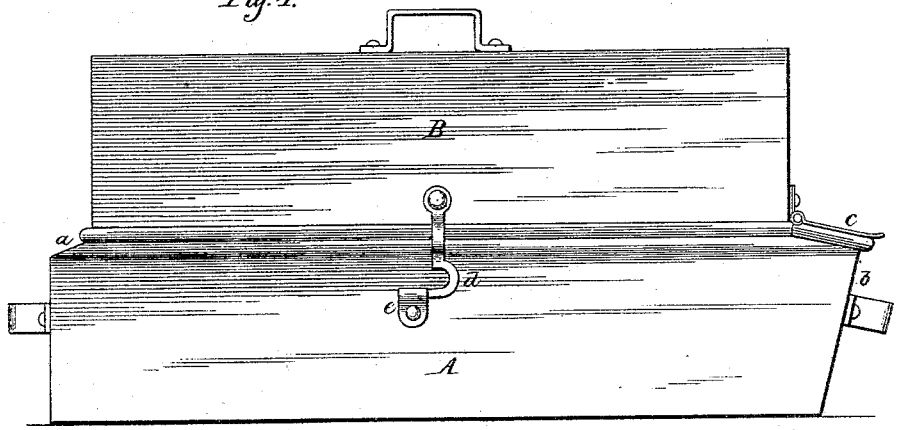
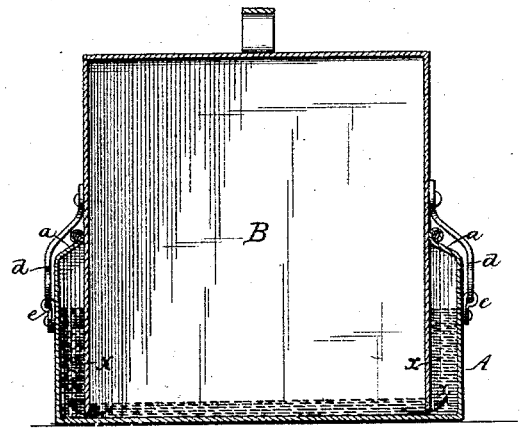
Witnesses:
John G. Hinkel
K. C. Hansmann.
N. Robert Baar,
Inventor:
By Foster & Freeman
Attorneys.

UNITED STATES PATENT OFFICE.

N. ROBERT BAAR, OF LOWVILLE, NEW YORK.

SELF-BASTING ROASTER.

SPECIFICATION forming part of Letters Patent No. 323,622, dated August 4, 1885.

Application filed May 8, 1884. (No model.)

*To all whom it may concern:*

Be it known that I, N. ROBERT BAAR, a citizen of the United States, and a resident of Lowville, in the county of Lewis and State of New York, have invented certain new and useful Improvements in Self-Basting Roasters, of which the following is a specification.

This invention relates to automatically-basting roasters for baking meats, fowls, or other articles of food which require to be basted during the process of cooking; and it consists in a two-part baking utensil which, when ready for use, is sealed to the admission of air from without, yet readily permits the escape of the steam generated by the heated liquids from within and partially surrounding the article being baked, as hereinafter fully described, and illustrated in the accompanying drawings, in which—

Figure 1 is a side view of a roaster embodying my invention, and Fig. 2 is a cross-section thereof on the line 1 2, Fig. 1.

In the use of the ordinary utensils employed for roasting meats and other like articles of food the basting of the same is troublesome and consumes a great deal of time, and if not perfectly done often results in the spoiling or burning of the article. To avoid these objections I construct a roaster which will automatically baste the article, while at the same time retaining all the flavors arising therefrom.

A is the lower section of my improved roaster, and is, as shown, a pan of a substantially rectangular shape with inwardly-turned edge flanges $a$, and an outwardly-projecting and inclined end, $b$, forming a spout by which any fluids contained in the vessel may be conveniently discharged therefrom.

B is the upper section of the roaster, and is also of a rectangular form, but is much deeper and somewhat shorter and narrower than the section A, and is adapted to fit into the latter with its top or closed side uppermost and its edges resting on the bottom of section A, as clearly shown in Fig. 2. The section B is provided at one end with a flap, $c$, hinged thereto about midway of its depth, and adapted to act as a cover to close the opening at the top of the spout $b$ in the section A, when the parts are in the position shown in Fig. 2. On each side of the section B is pivoted a hook, $d$, adapted to engage with ears $e$ on the sides of the section A, and by which the two sections are securely fastened together when the utensil is in use. Any other fastening device may be employed.

The section B is securely held in its proper position in the section A by the flanges $a$, and a chamber, $x$, is thus formed around the section B, which is partially filled with the fluid in which the article of food is being baked, which fluid thus effectually seals the space between the sections against the escape of any vapors or of the flavors of the article.

From the foregoing description the operation of my roaster will be readily understood.

The meat or other article to be roasted is placed in the section A, and the section B placed over the article and into the former section until its edges rest on the bottom thereof, when the two parts are securely fastened together by the hooks $d$. The fluid for basting purposes, after being properly seasoned, is put into the section A at the time the article to be roasted is placed therein. The roaster is then placed in the oven, and as its contents become heated the fluid therein is partially converted into steam, which rises and surrounds the meat and moistens the latter, keeping it at all times in a juicy state and preventing burning. As the roaster becomes filled with steam, the pressure of the same on the fluid in the bottom pan forces the fluid out into the chamber $x$, and as the steam follows it escapes to the space $x$ above the fluid, and if not condensed may escape freely from the spout $b$. When the pressure in the interior of the vessel has been diminished by the escape of the steam, the fluid in the chamber $x$ again enters the central space, and by its inward flow is brought again into intimate contact with the article of food, and flows upwardly on the sides thereof and bastes the same. This operation is repeated from time to time as steam is generated in the roaster, and thus every few moments the article being baked is thoroughly basted and the burning thereof prevented.

I am aware of Patent No. 263,049, and make no claim to the invention therein set forth.

I claim—

1. A self-basting roaster consisting of a vessel sealed, except at the bottom, and a pan receiving said vessel, with an intervening closed chamber freely communicating with the interior of the vessel below the edge thereof, substantially as described.

2. A roaster for meats or other articles of food, consisting of two sections, the main section sealed at the top, fitting one within the other with an intervening chamber having unobstructed communication with the open bottom of the inner vessel below the edge of said vessel, substantially as set forth.

3. A roaster for meats, &c., consisting of two sections detachably secured together, the inner section being sealed at the top and open at the bottom, and arranged to form an intervening chamber having unobstructed communication with the interior chamber, substantially as described.

4. A roaster for meats, &c., consisting of the sections A B, the former having a spout, $b$, with an intervening chamber, $x$, surrounding the section B, and a cover adapted to close the spout $b$, substantially as set forth.

5. A roaster consisting of a section or pan, A, with inwardly-turned side and end flanges and a section or receptacle, B, open at the lower end and adapted to fit within said flanges and rest on the bottom of the section A, substantially as described.

6. The combination of the pan A, having inturned side and end flanges, $a$, and inclined end $b$, and vessel or section B, open at the bottom and fitting within the section A, and a lid, $c$, closing the section A at one end, substantially as described.

7. A bake-pan consisting of two parts, A and B, the first open at the top and the second closed at the top, open at the bottom, and arranged within the first and sealed by a body of fluid within the part A, substantially as described.

In testimony whereof I have signed my name to this specification in the presence of two subscribing witnesses.

N. ROBERT BAAR.

Witnesses:
W. T. BUSH,
T. N. MANN.